Jan. 23, 1923.

C. P. SATTLER.

SEALING SHELL FOR STEERING WHEEL CASINGS.

FILED APR. 17, 1922.

1,442,975.

INVENTOR
Carl P Sattler,
by
Owen, Owen & Crampton

Patented Jan. 23, 1923.

1,442,975

UNITED STATES PATENT OFFICE.

CARL P. SATTLER, OF TOLEDO, OHIO, ASSIGNOR TO THE ROLLAWAY MOTOR COMPANY, OF TOLEDO, OHIO, A CORPORATION OF OHIO.

SEALING SHELL FOR STEERING-WHEEL CASINGS.

Application filed April 17, 1922. Serial No. 553,709.

*To all whom it may concern:*

Be it known that I, CARL P. SATTLER, a citizen of the United States, and a resident of Toledo, in the county of Lucas and State of Ohio, have made an Invention Appertaining to a Sealing Shell for Steering-Wheel Casings; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a means for enclosing the gear casing of a Ford steering wheel in a metallic shell that can not be opened once the shell is placed in position about the casing, except by unusual means, such as torch cutting of steel or other metal. The invention is of particular value when used in connection with steering wheels having locks for locking the wheel free from the steering shaft in the manner well known in the art.

Constructions containing the invention may be varied in their details. To illustrate a practical application of the invention I have shown a structure containing the invention and shall describe it hereinafter. The structure selected is illustrated in the accompanying drawings.

Figure 1:
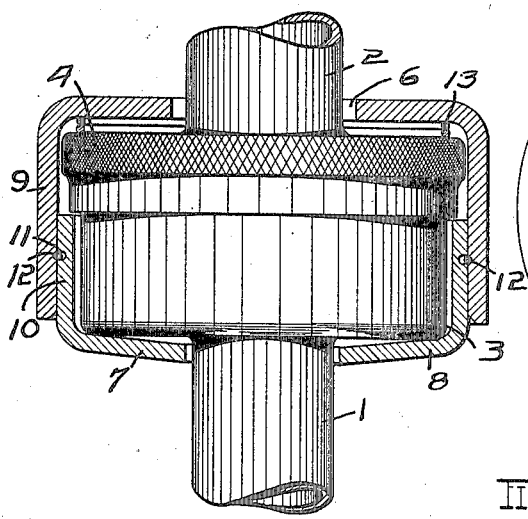
Figure 2:
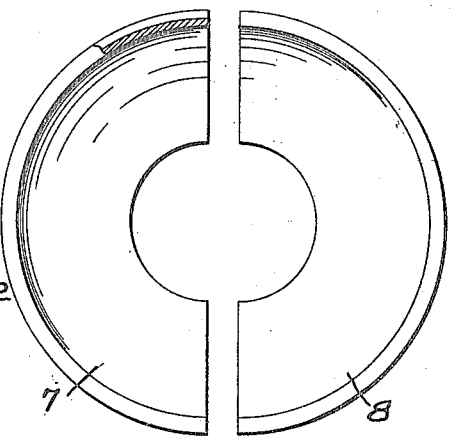
Figure 3:
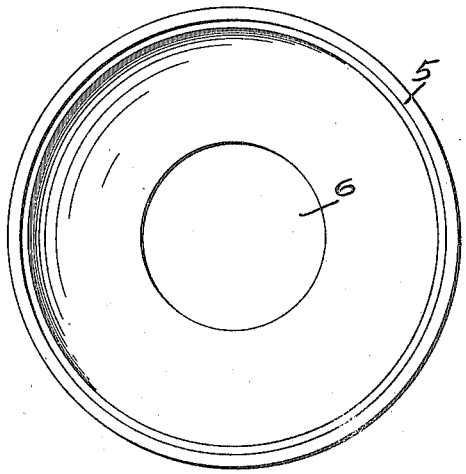
Figure 4:
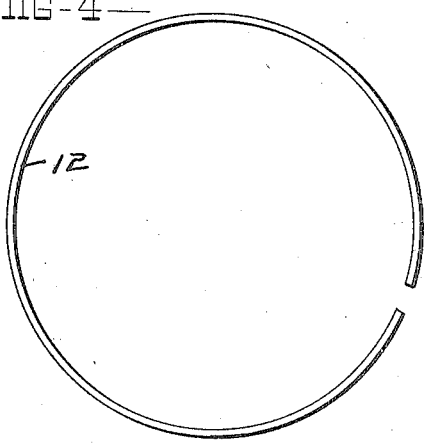
Figure 5:
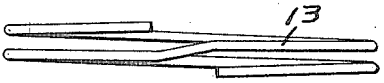

Figure 1 of the drawings illustrates a side view of the casing for enclosing the steering wheel gear commonly used in Ford automobiles, and a sectional view of the enclosing shell. Fig. 2 illustrates the bottom part of the shell. Fig. 3 illustrates the top of the shell. Fig. 4 illustrates a sealing or locking ring which securely connects and seals the parts of the shell together. Fig. 5 illustrates a spring disposed between the top of the casing and the inside surface of the top of the shell.

1, in the figures, illustrates a steering shaft or post. 2 indicates the shaft to which the steering wheel is connected. 3 indicates the steering wheel gear casing commonly used in connection with Ford cars. The casing is closed by a cap 4 which is usually threaded or fitted on to the body of the casing and is then secured by means of a pin. On removal of the pin or other part the casing may be easily opened and connection readily established with the steering shaft, and thus the car may be easily stolen, notwithstanding the fact that a locking device is located on or in the steering wheel hub which is operated to lock the car, that is, unlock the wheel connection with the steering shaft.

In order to seal the casing 3 and its cover 4 and prevent opening of the casing the casing is surrounded by a metallic shell, preferably of steel, that may be formed by casting or turning, or both, or by die pressing. The sealing shell is formed of the top or cover member 5 having a central opening 6 through which the stub axle of the driving shaft protrudes. The lower section of the shell is formed of the two parts 7 and 8 which, when placed together, form a bowl that may be fitted into the skirt 9 of the top part and between the skirt and the casing 3. The lower section is formed of two parts in order that the shaft 1 may be completely surrounded and in order that the section may be placed around the shaft or steering post 1. The skirts 9 and 10 of the top and bottom portions of the shell are each provided with a channel 11 that extends around the inner surface of the skirt 9 and the outer surface of the skirt 10. A spring ring 12 is held compressed in the channel in the skirt 10. The lower inner corner of the skirt 9 is bevelled so that the skirt 9 can be more readily pushed over the ring while it is being held compressed in the channel in the skirt 10. When the skirt 9 is pushed down far enough so that the channel located therein registers with the channel formed in the skirt 10, the spring 12 will expand and locate itself between the upper portion and the lower section of the shell, and thus lock the two together so that the parts of the shell cannot be separated, and tampering with the parts of the casing 3 will thus be prevented.

A spring 13 may be located between the top of the casing and the top of the shell so as to hold the bottom of the shell against the bottom of the casing and thus prevent any rattling.

I claim:

1. In a sealing means for casings and the like, a pair of cup-shaped interfitting sections, one of the sections being formed with a pair of semi-cup shaped parts and located within the other section, registering channels located in one of the sections and in the parts, a spring located in the said channels for sealing the parts together.

2. In a sealing means for casings and the like, a pair of cup-shaped interfitting sections, one of the sections being formed with a pair of semi-cup shaped parts and located within the other section, registering channels located in one of the sections and in the parts, a spring located in the said channels for sealing the parts together, a yielding cushion member located intermediate the casing and one of the sections.

In testimony whereof, I have hereunto signed my name to this specification.

CARL P. SATTLER.